United States Patent
Williamson et al.

(10) Patent No.: US 6,738,778 B1
(45) Date of Patent: May 18, 2004

(54) METHOD AND APPARATUS FOR MONITORING THE EXECUTION OF A PROGRAM

(75) Inventors: Paul Stuart Williamson, Round Rock, TX (US); David Michael Bender, Austin, TX (US); Michael Joseph Reynolds, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 09/210,104

(22) Filed: Dec. 11, 1998

(51) Int. Cl.⁷ .................................................. G06F 7/00
(52) U.S. Cl. ...................................... 707/101; 714/100
(58) Field of Search ................................ 707/101, 102, 707/103, 104, 200–204; 717/4, 5; 714/100, 1–2, 25, 30–31, 37–39, 48–57

(56) References Cited

U.S. PATENT DOCUMENTS

| | | | | | |
|---|---|---|---|---|---|
| 5,513,317 A | * | 4/1996 | Borchardt et al. | ..... | 395/183.21 |
| 5,644,487 A | * | 7/1997 | Duff et al. | ..... | 700/56 |
| 5,802,291 A | * | 9/1998 | Balick et al. | ..... | 709/202 |
| 5,978,937 A | * | 11/1999 | Miyamori et al. | ..... | 714/45 |
| 6,083,281 A | * | 7/2000 | Diec et al. | ..... | 717/4 |
| 6,094,729 A | * | 7/2000 | Mann | ..... | 714/25 |
| 6,118,940 A | * | 9/2000 | Alexander, III et al. | ..... | 395/704 |
| 6,131,185 A | * | 10/2000 | Coskun et al. | ..... | 717/4 |
| 6,134,676 A | * | 10/2000 | VanHuben et al. | ..... | 714/39 |
| 6,138,171 A | * | 10/2000 | Walker | ..... | 709/318 |
| 6,139,198 A | * | 10/2000 | Danforth et al. | ..... | 395/704 |
| 6,145,121 A | * | 11/2000 | Levy et al. | ..... | 717/4 |
| 6,145,123 A | * | 11/2000 | Torrey et al. | ..... | 717/4 |

* cited by examiner

Primary Examiner—James P. Trammell
Assistant Examiner—Mary Cheung
(74) Attorney, Agent, or Firm—Leslie A. Van Leeuwen; Bracewell & Patterson, L.L.P.

(57) ABSTRACT

The present invention is related to "trace" and debugging capability in the operation of the Java programming utility. It represents a means to execute a program in such a way that the sequence of statements being executed can be observed. It is related to "debugger", which is a program designed to aid in debugging another program by allowing the programmer to step through the program, examine the data and monitor conditions, such as the values of the variables, and correct the problem.

24 Claims, 2 Drawing Sheets

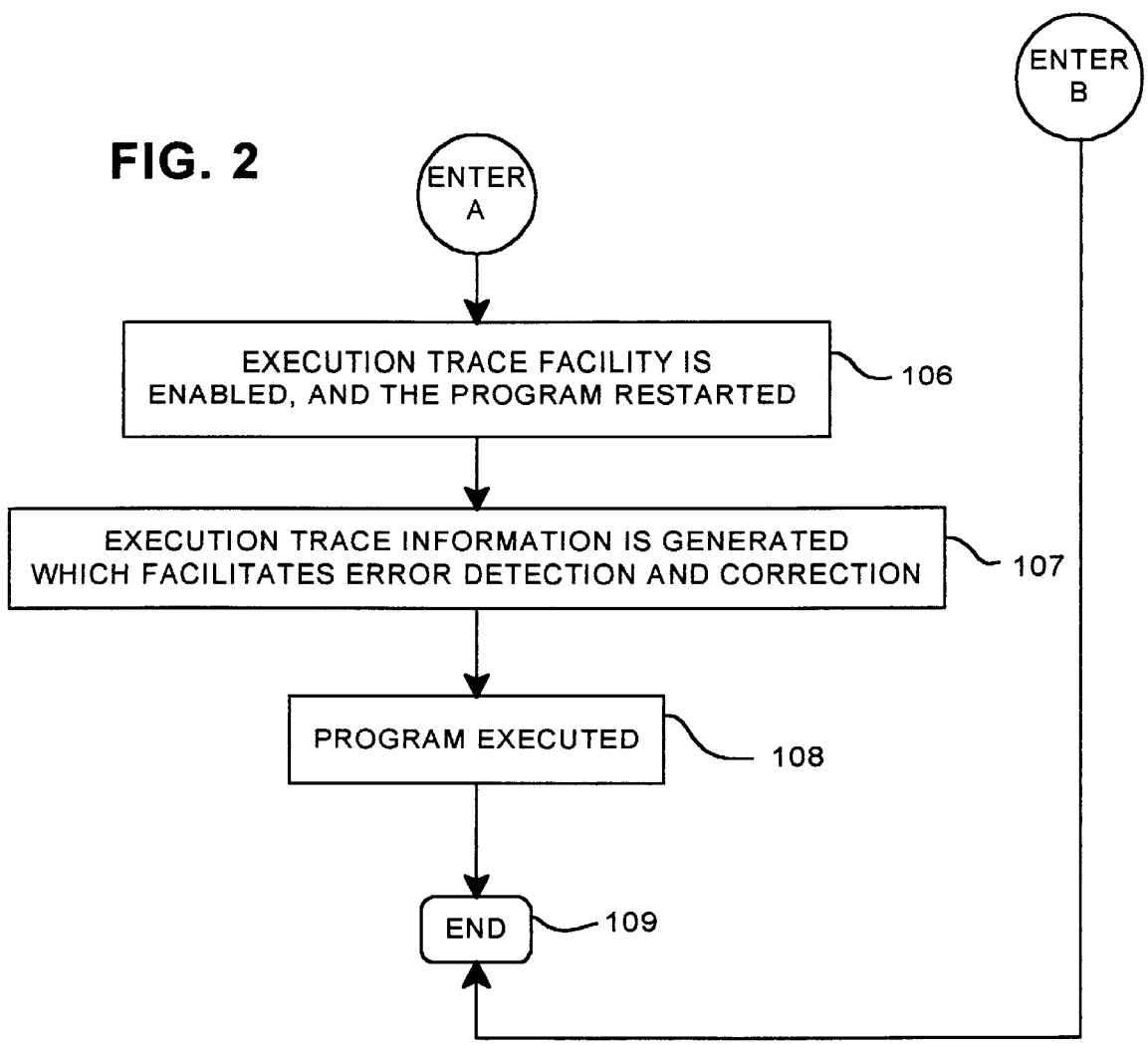

METHOD AND APPARATUS FOR MONITORING THE EXECUTION OF A PROGRAM

TECHNICAL FIELD

A portion of the disclosure of this patent document contains material which is subject to copyright protection. The copyright owner has no objection to the facsimile reproduction by anyone in the patent disclosure, as it appears in the Patent and Trademark Office patent files or records, but otherwise reserves all copyright rights whatsoever.

BACKGROUND OF RELATED ART

1. Field of the Present Invention

The present invention is related to "trace" and debugging capability in the operation of the Java utility program. It represents a means to execute a program in such a way that the sequence of statements being executed can be observed. It is related to "debugger", which is a program designed to aid in debugging another program by allowing the programmer to step through the program, examine the data and monitor conditions, such as the values of the variables, and identify problem errors.

2. History of Related Art

It is helpful to describe the software test process to demonstrate the utility of the current invention. A ("Generic" process for software testing would be as follows. After software is designed and written, it is unit tested, functionally tested, system tested and then released as a product. During the various test phases, testers execute the program as a normal user might do. If errors are encountered the program can be executed in a controlled "debug" environment. Debug environments are external to and distinct from the program being tested. Although quite useful, they are complicated and require a level of experience and skill to operate effectively. Within debug environments, the program under test can be suspended at definable points and it's state inspected to determine if it is executing as designed. For example, if a program is to create temporary files at some point during it's execution, the program can be suspended at an appropriate point and the tester can determine if the temporary files exist and are in the correct format.

After a software product is released for sale, there are invariably still some, to a lesser or greater degree, defects present in the product. Consumer support personnel, employed by the software development companies, are responsible for determining the cause of program malfunctions based on customer input after the product is in the hands of the customer. At customer sites, when program defects arise, there is almost never the skill or a debug environment available to help diagnose malfunctions. Customer support personnel must attempt to diagnose malfunctions with a minimum of diagnostic information. This is a very serious problem facing software development firms in today's computer marketplace.

It would therefore be a distinct advantage to have a method and system that would overcome the many problems enumerated above. The present invention provides such a method and apparatus.

DEFINITIONS

Before going into the details of the present invention, it might be appropriate to define certain terms which are used in the description of the system.

Java, well established in the late 1990s, is an object oriented programming language developed by Sun Microsystems, Inc. While Java is similar to C++, Java is smaller, more portable and easier to use than C++. This is because it is more robust and it manages memory on its own.

Java was designed to be secure and platform neutral. In other words, it can be run on any platform since Java programs are complied into byte codes, which are similar to machine code and are not specific to any platform.

The term "trace" can be defined as a means to execute a program in such a way that the sequence of statements being executed can be observed. This is related to "debugger", which is a program designed to aid in debugging another program by allowing the programmer to step through the program, examine the data and monitor conditions such as the values of the variables.

The term "debug" means to detect, locate and correct logical or syntactical errors in a program or malfunctions in hardware. In a hardware context, the term troubleshoot is the term more often used, especially when a problem is a major one.

SUMMARY OF THE PRESENT INVENTION

The preferred embodiment of the present invention is an Execution Trace Facility that is written in 100% Java and provides execution tracing capability. This capability makes available the Java Package name, Class name, Method name and source code line number of the line of code in the Java class from which the trace facility was called. In other words, it makes available all pertinent data required to trace program execution flow. This facility is useful for program problem identification and resolution. It provides detailed process execution trace information that, when analyzed, can identify the source of program errors. It is easily incorporated into releasable product code in a disabled mode. In this mode there is no end user awareness of it's presence. If a program error occurs, the facility can be enabled and valuable trace information generated. One significant attribute of the present invention is that no additional debugging environment above and beyond the program itself is required to generate the program execution trace.

A call to the Execution Trace Facility is inserted into the code of the program to be tested at various strategic locations, usually as the first line of each method and the program is recompiled. The program is then used in a normal operating environment. If during normal execution a program malfunction occurs, the Execution Trace Facility can be enabled and the program restarted. Execution trace information is then generated, which facilitates error detection.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 2 represents the second half of the process commencing just after the query as to whether during the execution a malfunction occurs in FIG. 1 and ends with error detection and correction.

DETAILED DESCRIPTION OF THE PREFERRED EMBODIMENT

Figure 1:
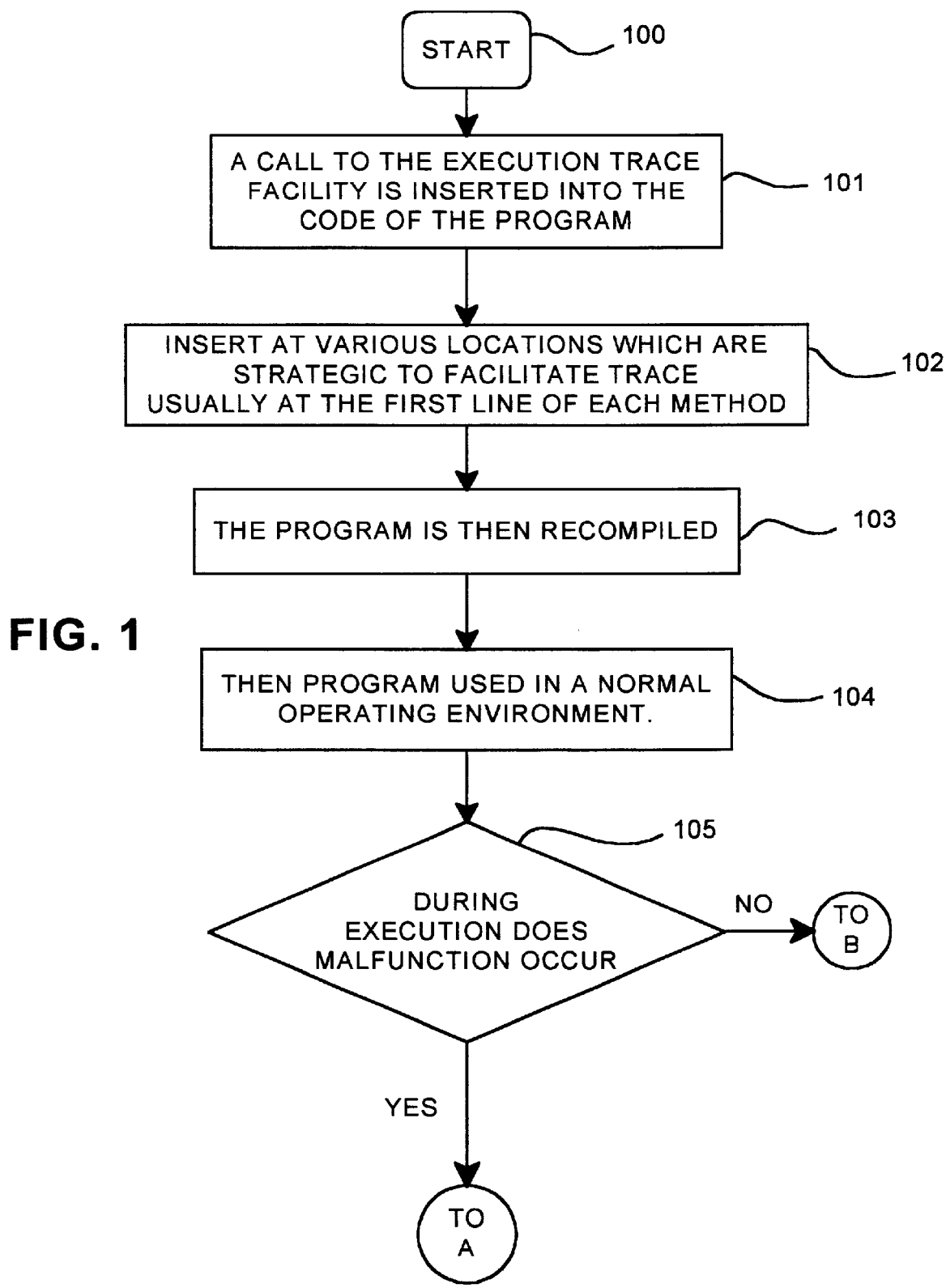
FIG. 1 is a flowchart depicting the steps employed using the Execution Trace Facility. This is the basis of the present invention. It shows how this system is employed to detect program malfunctions.

There are numerous advantages and benefits to the present invention Execution Trace Facility. This invention is distinguished from currently existing "trace implementations" in that most implementations require that each call to the trace facility be "hardcoded" within the calling routine's execution context, i.e. the currently executing filename, subroutine, etc., in order to enable the debugger to locate the currently executing code segment. This necessitates a great deal of programmer effort in the initial coding and ongoing maintenance. The Execution Trace Facility needs merely to be called and it generates the trace information automatically locating the currently executing code segment.

Another benefit is that this invention does not require any additional debug environment. It is an integral part of the application itself. Other trace facilities require an additional debug program which monitors and controls the execution of the program under test.

The Execution Trace Facility, as noted above, is a method for tracing computer software program flow through it's various component modules, thereby providing valuable information for diagnosis and repair of software defects, without the use of an external debug environment. The Execution Trace Facility is very easily incorporated by software developers into the software product itself by merely inserting calls to the facility's trace function. During development, as a software product evolves, its underlying code may change many times. Through this product evolution, the Execution Trace Facility requires almost no maintenance to be kept fully functional.

In it's use this facility is bimodal. It is either enabled or disabled. It is shipped to the customer in product code in a disabled mode in which its presence is invisible to the customer. The software program functions normally as if the trace facility was not there. Should a program malfunction occur, the Execution Trace Facility can be enabled and it will provide valuable diagnostic information.

The process for enabling and disabling this facility makes use of the way in which Java programs are executed by the Java Virtual Machine (JVM). The JVM uses a ("classpath" environment variable to locate class files that are called by the currently executing Java program. (The classpath is similar in form and function to the ("path" environment variable that is used by many operating systems to locate executable files.) As the JVM searches the classpath, the first file that matches the name of the routine for which it is searching is brought into the JVM and used by the executing Java program. If duplicate file names exist in the classpath directories, the files located farther down in the classpath search are never found or used by the JVM.

Two versions of the Execution Trace Facility are shipped with each product. One version, the enabled version, is fully functional. It generates the trace information. The other version, the disabled version, is a "stub" program. A Stub program has no functional code inside its methods. It contains identical method declarations to, and is an acceptable substitute for, an enabled version. It's methods do not perform any function when they are called.

A program product that contains the Execution Trace Facility is shipped with the trace facility in a disabled mode. In this mode, the disabled version of the trace facility is located where it can be found by the JVM as it searches the classpath. The enabled version of the Execution Trace Facility is in a directory that does not appear in the classpath and is, therefore, never found by the JVM.

The trace facility is enabled by a simple program which prepends the classpath with the name of the directory containing the enabled version of the Execution Trace Facility. The enabled version is now located first in the classpath and is used by the JVM. The trace facility is disabled by restoring the classpath to its original state. The Execution Trace Facility requires no additional skill or customer interaction to operate.

The Source Code for accessing the present invention, Execution Trace Facility, is set forth as follows in Java language.

```
//***********************BEGIN Class Trace Test
********************************
package Util;
public class Trace Test
{
    public static void main(String args[ ])
    {
        Tracer.trace( );
        new Trace Test( );
    }
    public TraceTest( )
    {
        Tracer.trace( );
        func1( );
        func2( );
        return;
    }
    private void func1( )
    {
        Tracer.trace( );
        return;
    }
    private void func2( )
    {
        Tracer.trace( );
        return;
    }
}
//*************************END Class Trace Test
**********************************
//*************************BEGIN Output
**********************************************
//*** output is of the form: Executing:
Package.Class.Method:lineNumber*****
Executing:Util.TraceTest.main:7
Executing:Util.TraceTest.<init>:13
Executing:Util.TraceTest.func1:21
Executing:Util.TraceTest.2:27
//*********************** END Output
**************************************************
//***********************BEGIN Source code for
    Trace
Facility
*******************
package Util;
import java.io*;
import java.util.StringTokenizer;
import java.lang.String;
public class Tracer
{
    public static void trace( )
```

```
{
    java.lang.System.out.println("Executing:"+
Tracer.getMethod(2));
}
private static String getMethod(int callDepth)
{
    if (!(System.getProperties( ).getProperty
        ("os.name").equals("OS/2")))
    {
        callDepth++
    }
    Error e=new Error( );
    StringWriter stringwriter=new Stringwriter( );
    PrintWriter printwriter=new
        PrintWriter(stringwriter);
    e.printStackTrace(printWriter);
    StringTokenizer sT=new
        StringTokenizer(stringWriter.toString( ),"\n");
    String method;
    for (int i=0;
        i<callDepth+1;
        i++)
    {
        method=sT.nextToken( );
    }
    method=sT.nextToken( ).trim( ).substring(3);
    if(method.indexOf("Complied Code")>-1)
    {
        method=method.substring(0, method. indexOf
            ("Compiled Code"))+")";
    }
    if(!(System.getProperties( ).getProperty("os.name")
        .equals("OS/2)))
    {
        method=method.substring(0, method.indexof("
            ("))+method.substring(method.indexof(":"),
            (method.length( )-1));
    }
    return method;
}
}
//*******************END Source code for Trace
    Facility
*****************
```

Copyright 1998 International Business Machines Corporation.

FIG. 1 is a flowchart that depicts the process of employing the Execution Trace Facility. The process begins at 100. The process calls for the Execution Trace Facility to be inserted into the code of the program at 102. The Execution Trace Facility is inserted at various locations which are strategic to facilitate trace, usually as the first line of each method 102. The program is then recompiled 103 and then used in a normal operating environment.

The query is then raised at 105 as to whether a malfunction occurs. If there is no malfunction then the program is executed to completion at FIG. 2 at 109. However, if the answer to FIG. 1 at 105 is yes then the Execution Trace Facility is enabled and the program is restarted at FIG. 2 106. Then the Execution Trace Facility information is generated which facilitates error detection and correction at 107 and then the program is executed at FIG. 2 108 and the program is successfully completed at FIG. 2 109.

While the invention has been shown and described with reference to particular embodiments thereof, it will be understood by those skilled in the art that the foregoing and other changes in form and detail may be made therein without departing from the spirit and scope of the invention.

What is claimed is:

1. An Execution Trace Facility computer system, which provides all available pertinent data required to trace a program flow for malfunctions, comprising:
    means for inserting said Execution Trace Facility into the code of the program in a disabled mode, at various strategic locations;
    means for recompiling said program after said Execution Trace Facility is inserted into said code of the said program;
    means for using said program in a normal operating environment and for determining if a malfunction of said program occurs; and
    means for enabling said Execution Trace Facility to restart said program and detect and correct said malfunction only in response to a detection that a malfunction of said program has occurred.

2. The computer system of claim 1 wherein said Execution Trace Facility upon activation, generates the trace information automatically.

3. The computer system of claim 2 wherein the activation of said Execution Trace Facility, locates the currently executing code segment.

4. The system of claim 1 wherein said system is based on the JAVA object oriented programming language.

5. The system of claim 1 wherein said Execution Trace Facility is a Java utility, which provides said execution tracing capability; and
    which makes available a Java Package name, Class name, Method name and source code line number of the line code in said Java class from which said Execution Trace Facility was called.

6. The system of claim 1 which makes available all pertinent data required to trace program execution flow and program problem identification and resolution.

7. The system of claim 1 which does not require any additional debug environment to monitor and control the execution of the program under test.

8. The system of claim 1 wherein said Execution Trace Facility can be readily incorporated, by software developers, into the software product by merely inserting calls to the facility's trace function.

9. An Execution Trace Facility computer method, which provides all available pertinent data required to trace a program flow for malfunctions, comprising:
    inserting said Execution Trace Facility into the code of the program in a disabled mode, at various strategic locations;
    recompiling said program after said Execution Trace Facility is inserted into said code of the said program;
    using said program in normal operating environment and determining if a malfunction of said program occurs; and
    enabling said Execution Trace Facility to restart said program and detect and correct said malfunction only in response to a determining that,a malfunction of said program has occurred.

10. The computer method of claim 9 wherein said Execution Trace Facility upon activation, generates the trace information automatically.

11. The computer method of claim 10 wherein the activation of said Execution Trace Facility, locates the currently executing code segment.

12. The computer method of claim 9 wherein said system is based on the JAVA object oriented programming language.

13. The computer method of claim 9 wherein said Execution Trace Facility is a Java utility, which provides said execution tracing capability; and which makes available the said Java Package name, Class name, Method name and source code line number of the line code in said Java class from which said trace facility was called.

14. The computer method of claim 9 which makes available all pertinent data required to trace program execution flow and program problem identification and resolution.

15. The computer method of claim 9 which does not require any additional debug environment to monitor and control the execution of program under test.

16. The method of claim 9 wherein said Execution Trace Facility can be readily incorporated, by software developers, into the software product by merely inserting calls to the facility's trace function.

17. A computer readable program having data structures included on a computer readable medium which causes the display on a data processor controlled display of an Execution Trace Facility computer program, which provides all available pertinent data required to trace a program flow for malfunctions, comprising:

means for inserting said execution Trace Facility into the code of the program in a disabled mode, at various strategic locations;

means for recompiling said program after said Execution Trace Facility is inserted into said code of the said program;

means for using said program in normal operating environment and for determining if a malfunction of said program occurs; and enabling said Execution Trace Facility to restart said program and detect and correct said malfunction only in response to a determining that a malfunction of said program has occurred.

18. The computer readable program of claim 17 wherein said Execution Trace Facility upon activation, generates the trace information automatically.

19. The computer readable program of claim 17 wherein the activation of said Execution Trace Faclity, locates the currently executing code segment.

20. The computer readable program of claim 18 wherein said system is based on the JAVA object oriented programming language.

21. The computer readable program of claim 17 wherein said Execution Trace Facility is a Java utility, which provides said execution tracing capability; and which makes available the said Java Package name, Class name, Method name and source code line number of the line code in said Java class from which said trace facility was called.

22. The computer readable program of claim 17 which makes available all pertinent data required to trace program execution flow and program problem identification and resolution.

23. The computer readable program of claim 17 which does not require any additional debug environment monitor and control the execution of program under test.

24. The computer readable program of claim 17 wherein said Execution Trace Facility can be incorporated, by software developers, into the software product by merely inserting calls to the facility's trace function.

* * * * *